No. 700,723. Patented May 27, 1902.
T. F. BEHRMAN.
HAY LOADING APPARATUS.
(Application filed Mar. 17, 1902.)
(No Model.) 2 Sheets—Sheet 1.
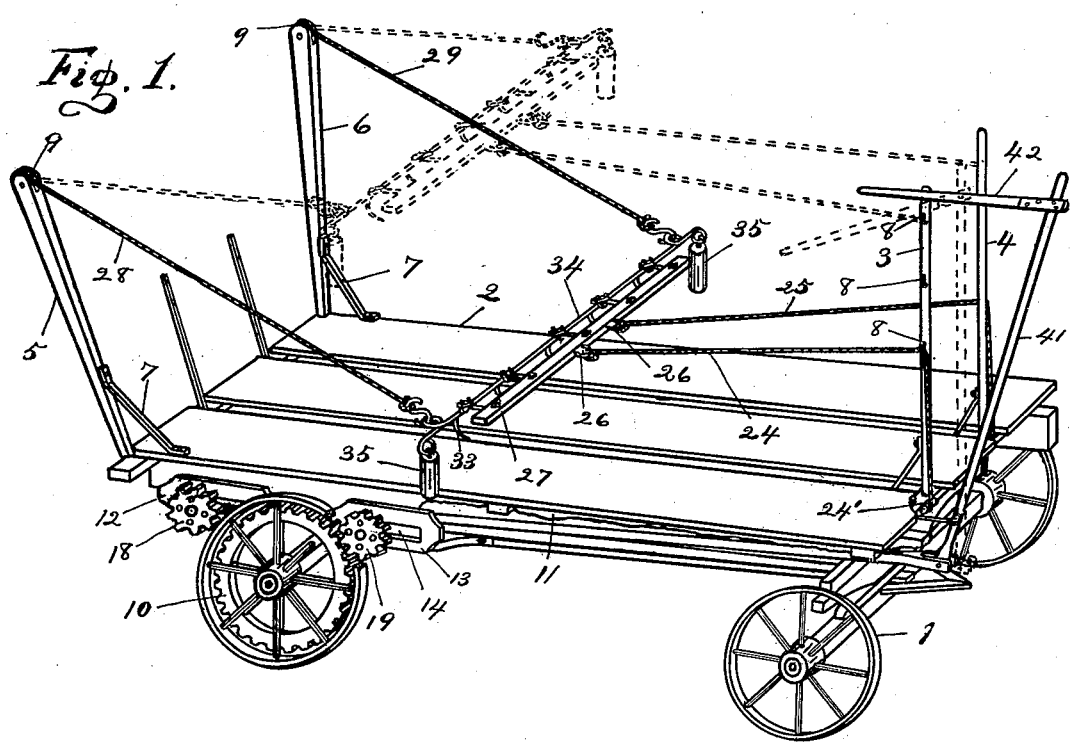
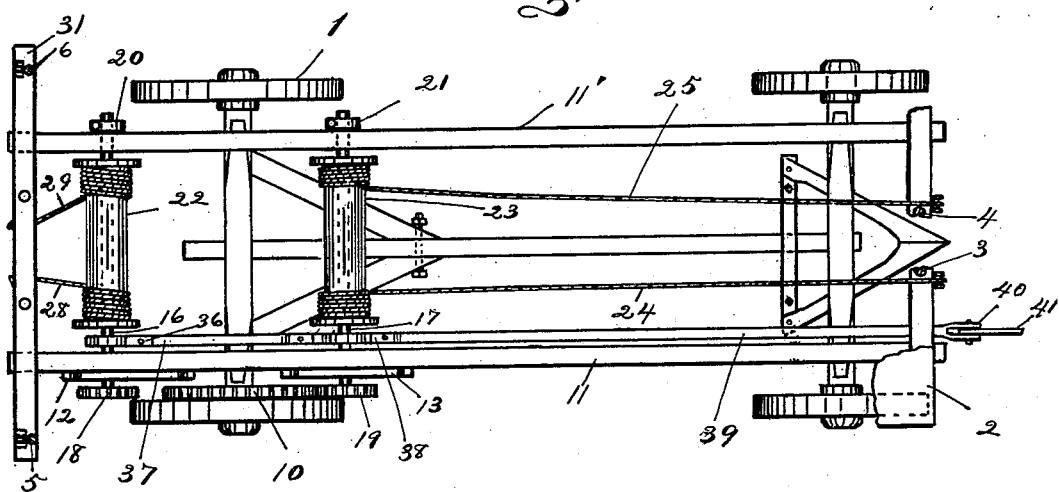
WITNESSES: Adelaide Kearns. Augusta Viberg.
Theodore F. Behrman INVENTOR
BY Chapin & Denny
His ATTORNEYS.
THE NORRIS PETERS CO., PHOTO-LITHO., WASHINGTON, D. C.

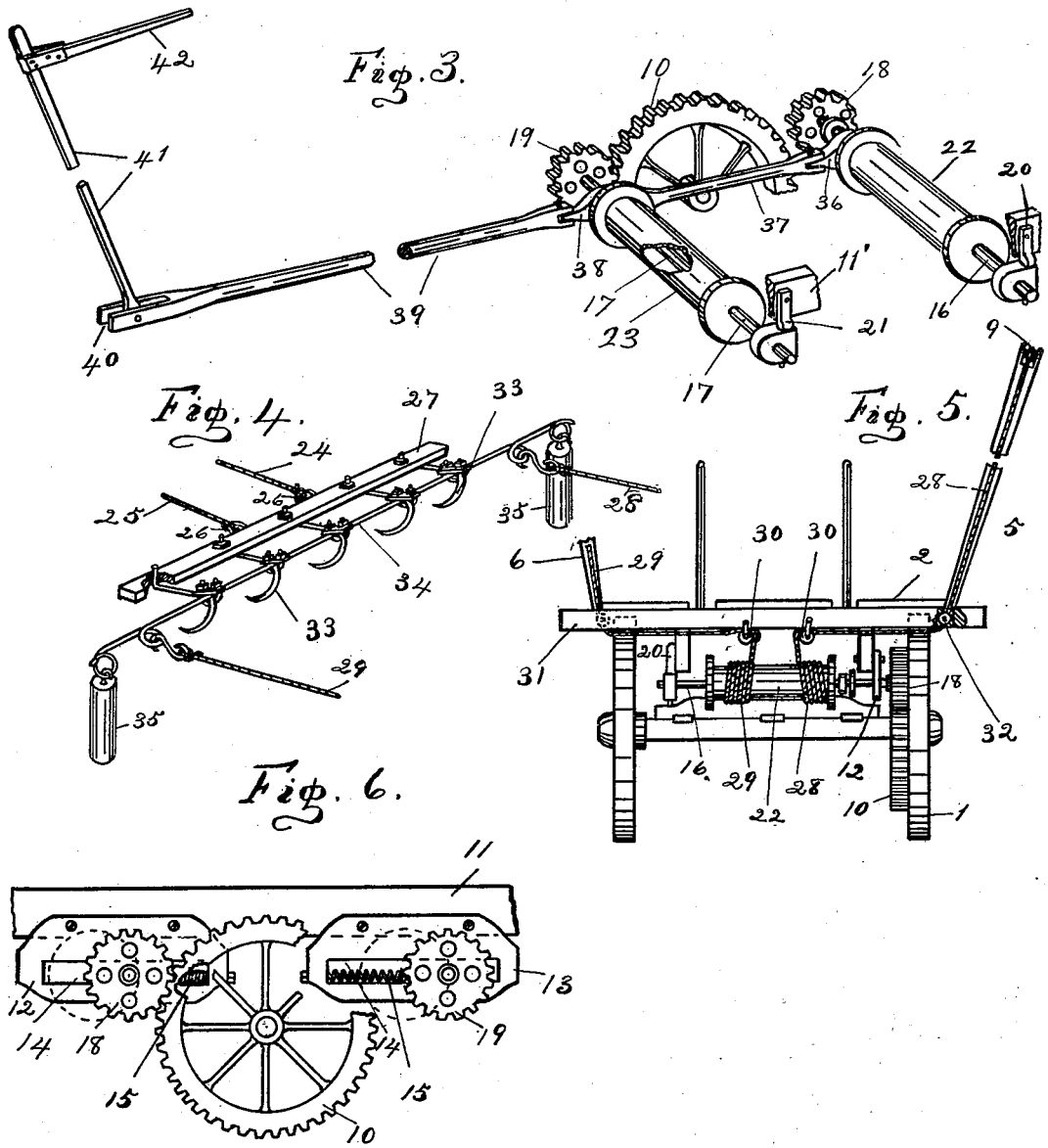

UNITED STATES PATENT OFFICE.

THEODORE F. BEHRMAN, OF FORT WAYNE, INDIANA.

HAY-LOADING APPARATUS.

SPECIFICATION forming part of Letters Patent No. 700,723, dated May 27, 1902.

Application filed March 17, 1902. Serial No. 98,561. (No model.)

*To all whom it may concern:*

Be it known that I, THEODORE F. BEHRMAN, a citizen of the United States, residing at Fort Wayne, in the county of Allen, in the State of Indiana, have invented certain new and useful Improvements in Hay-Loading Apparatus; and I do hereby declare that the following is a full, clear, and exact description of the invention, which will enable others skilled in the art to which it appertains to make and use the same, reference being had to the accompanying drawings, which form part of this specification.

My invention relates to improvements in hay-loading apparatus.

The object of my present invention is to provide a cheap, simple, and efficient loading attachment for a hay-wagon adapted to be actuated by the ordinary movement of the wagon in use and adapted to deliver the hay from the rear end of the wagon-rack, upon which it is deposited from time to time in the usual or other proper manner, to the forward and other portions thereof, as desired, by the manipulation of a single operator, who also drives the team.

My invention consists of a pair of rotatable drums suspended from the rear portion of the hay-rack in transverse arrangement, carrying upon one end thereof fixed gear-wheels adapted to be thrown into an engagement with an actuating-gear upon the inner face of one of the rear wagon-wheels, a series of operating-levers adapted to shift said gear-wheels into such engagement successively, but not simultaneously, a traveling loader-bar in transverse arrangement suspended above the said rack and provided with a series of tines for grappling the hay, and a series of draft ropes or cables connecting the said bar with the said drums, respectively.

The principal novel feature of my invention resides in the combination of operative parts whereby the driver alone can so manipulate the apparatus as to automatically deliver and distribute the hay from the rear end of the rack upon which it has been previously deposited to any desired portion of the rack in loading the same.

Referring now to the accompanying drawings, in which similar reference-numerals indicate like parts throughout the several views, Figure 1 is a perspective view of my invention in operative position upon a common form of hay-wagon, broken away in part and showing the apparatus in the position it assumes when the traveling bar is carrying the hay forward and also showing in dotted outline the position the operating mechanism assumes when the traveling bar is being returned to the rear end of the rack for another operation. Fig. 2 is a plan view of the same with a portion of the rack and operating-levers and the traveling bar removed to show the relative arrangement of the winding-drums and the driving mechanism therefor. Fig. 3 is a perspective detail of the winding-drums, driving-gears, and operating-levers therefor, broken away in part and showing the pivoted hangers for one end of the drum-shafts. Fig. 4 is a rear perspective detail of the traveling bar, showing the relative arrangement of the tines and draft-rod. Fig. 5 is a rear end view of Fig. 1, broken away in part. Fig. 6 is an enlarged detail side view of the meshing-gears, broken away in part.

On any suitable wagon-truck 1 is removably mounted in the usual manner a proper hay-rack 2 of the usual construction, except that instead of the usual upright standard at the front end of the rack I have arranged a pair of vertical standards 3 and 4, Fig. 1, rigidly fixed at their lower end in the front end of the rack 2, and at the corners of the rear end of said rack are arranged a pair of upright standards 5 and 6, identical in construction and rigidly fixed thereto by means of the braces 7 or other proper manner.

The forward standards 3 and 4 are provided upon their outer faces with a series of guiding-hooks 8 for the forward draft-ropes, hereinafter described. The standards 5 and 6 are each provided in their upper end with an idler or guide pulley 9 for the rear draft-ropes, hereinafter described. One of the rear wheels of the said truck is provided upon its inner face with a fixed gear-wheel 10, whose spokes are preferably fixed in the hub of said rear wheel in the usual manner. In close proximity to the said gear 10 and upon the outer face of the adjacent side bar 11 are rigidly fixed the boxes or journal-bearings 12 and 13, each of which has a lateral longitudinal slot 14, in which the journals of the adjacent ends of the respective drum-shafts 16 and 17 are loosely mounted. In the inner ends of the slots 14 are arranged the coil-springs 15, adapted by their tension to normally hold said journals at or near the outer end of said slots, Fig. 6. On the free end of these shafts 16 and 17, in coöperative relation with the said gear, are rigidly mounted the gear-wheels 18 and 19, respectively, adapted to be adjusted into an actuating engagement with the said gear 10 against the tension of the said coil-springs, respectively, in the manner hereinafter described. The other ends of the said drum-shaft are rotatably mounted in the hangers 20 and 21, respectively, which are pivotally suspended from the outer face of the rack side bar 11', thereby adapting the said ends of the said shafts for a limited lateral movement when the said wheels 18 and 19 are shifted into their actuating engagement.

On the shafts 16 and 17 are rigidly fixed proper drums 22 and 23, respectively, Fig. 2, to the latter of which are secured at or near the ends thereof the draft ropes or cables 24 and 25, whose other ends are extended forward beneath the rack 2, passed over guide-pulleys 24 on the forward end of said rack and at the base of the standards 3 and 4, then upward over the guiding-hooks 8, and are then secured in proper staples 26 in the front face of the transversely-arranged traveling bar 27.

To the drum 22, at or near its ends, I secure one end of the draft ropes or cables 28 and 29, which are then passed upward and rearwardly over the guide-pulleys 30, which are rotatably mounted upon the lower face of the cross-piece 31 of the rack 2, thence over idlers 32 in the cross-piece 31, at or near the base of the standards 5 and 6, Figs. 2 and 5, thence upward along the rear face of the said standards 5 and 6 and over the said idlers 9 in the top thereof, and thence forward in approximately parallel relation to the said traveling bar 27.

The bar 27 is provided with a series of spaced rearwardly-projecting, downwardly-bent, and forwardly-curved tines 33, to the top of which is rigidly fixed the draft-rod 34, Fig. 4, carrying upon its ends proper weights 35 to steady the bar and aid in holding it down to its work. These weights can of course be omitted, if desired; but their use is preferred. To this rod 34 the forward ends of the cables 28 and 29 are secured, Fig. 1. The means for shifting the said gear-wheels 18 and 19 into engagement with the gear 10 for the purpose of actuating the said winding-drums is described as follows: To one end of the shaft 16 and adjacent to the inner face of the side bar 11, Fig. 2, is loosely mounted the short lever 36, to whose forward end is pivotally mounted the lever 37, whose forward end is in turn pivotally connected to the short lever 38, which is loosely mounted midway of its ends on the shaft 17.

To the forward end of the lever 38 is pivotally connected the lever 39, whose bifurcated forward end projects slightly beyond the forward end of the rack 2. In this bifurcation 40 is pivotally mounted the lower end of the upright lever 41, in whose bifurcated upper end is pivotally mounted the forward end of the horizontally-arranged hand-lever 42.

The operation and manner of employing my invention thus described is obvious and, briefly stated, is as follows: Assuming the traveling bar 27 to be in substantially the position shown in Fig. 1, with the operator in position upon the front end of the rack 2, from whence he can conveniently control the team and also manipulate the hand-lever 42, the hay to be loaded is deposited in suitable quantities successively in the usual or other proper manner upon the rear end of the rack 2, after which the operator pulls the upper end of the lever 41 rearwardly by means of the lever 42, thereby shifting both of the wheels 18 and 19 forward until the wheel 18 is brought into engagement with the gear 10. He now drives forward, which rotates the drum 22 rearwardly, and thereby winds the cables 28 and 29 thereon, which in turn draws the suspended bar 27 to the rear end of the rack 2, the draft-cables 24 and 25 being free to unwind from the drum 23. The bar 27 is now in position to be lowered into engagement with the hay to be moved, and the operator by pushing the lever 41 forwardly, as shown in Fig. 1, shifts both of the wheels 18 and 19 rearwardly, thereby disengaging the former and engaging the latter with the gear 10, after which the forward motion of the wagon will wind the draft-cables 24 and 25 upon the drum 23, thereby drawing the bar 27, with its load, forward on the rack to the desired position for depositing it, after which the operator pulls the lever 41 rearwardly, thereby again engaging the gear-wheel 18 with the gear 10, which reverses the direction of travel of the bar 27 and carries it to the rear end of the rack for another operation, as above described. Obviously when the bar 27 is traveling forwardly the cables 28 and 29 are free to unwind from the drum 22. In starting the load the cables 24 and 25 are preferably arranged in the lower of the guides 8; but as the load is built up these cables can be mounted in the upper of said guides 8 to permit the said traveling bar to more readily clear the upper surface of the load in use. It is also obvious that the coil-springs 15 in the slots 14 can be so adjusted as to normally hold the said wheels 18 and 19 both out of engagement with the actuating-gear 10, whereby such an engagement of these wheels must be made against the tension of these springs, respectively.

Having thus described my invention and the manner of operating the same, what I desire to secure by Letters Patent is—

1. In a hay-loading apparatus a hay wagon or truck; a gear-wheel fixed upon one of the rear wheels of said truck; a pair of rotatable shafts in transverse arrangement carrying upon one end thereof gear-wheels in coöperative arrangement with the said gear, as described; winding-drums fixed on said shafts respectively; a traveling bar suspended above said wagon by means of draft-cables; two pairs of draft-cables having their upper ends secured to said bar and extending in opposite directions over suitable guides to the said drums respectively, to which their other end is secured and upon which they are adapted to be wound; and means for shifting the said drum-shaft gears into engagement with the said actuating-gear for the purpose described.

2. In combination with a hay-wagon, a hay-loading apparatus consisting of a driving-gear fixed upon one rear wheel of the said wagon as shown; rotatable transverse shafts carrying upon one end thereof gear-wheels adapted to be thrown, one at a time, into engagement with the said gear, as described; winding-drums fixed on said shafts respectively; a traveling loader-bar suspended above the wagon by the draft-cables; draft-cables having one end secured to said drums and the other end secured to the said traveling bar, and adapted to move the same to and fro above the said wagon under the impulse of the said gears; means for normally securing said gears out of engagement; and means for holding said gear-wheels into engagement with the said actuating-gear.

3. A hay wagon or truck carrying upon one of its rear wheels a fixed driving gear-wheel; transverse drums adjustably mounted in laterally-adjustable bearings and carrying upon one end thereof a fixed gear-wheel adapted to be shifted into mesh with said driving-gear; means for normally holding said wheels out of such engagement; means for shifting the said wheels into an actuating engagement with the said gear; a traveling loader-bar provided with a series of tines for grappling and moving the hay as described, and suspended above the wagon by means of forward and rear draft-cables; and draft-cables having one end secured to the said drums respectively, and having the other end secured to the said bar as described, and adapted to actuate the bar.

4. In a hay-loading apparatus a pair of rotatable drums in parallel arrangement carrying upon one end thereof a gear-wheel; a driving-gear adapted for an actuating engagement with the said wheels as described; means for normally securing said wheels out of such engagement; means for securing said wheels when desired, in an actuating engagement with the said gear; a traveling loader-bar suspended by forward and rear actuating draft-cables; and draft-cables having one end secured to said bar and the other end secured to said drums upon which they are adapted to be wound.

Signed by me at Fort Wayne, Allen county, State of Indiana, this 8th day of March, A. D. 1902.

THEODORE F. BEHRMAN.

Witnesses:
ADELAIDE KEARNS,
BEN LEVY.